Aug. 25, 1959   A. G. MEAKER   2,901,282
TRAILER CONSTRUCTION
Filed Jan. 15, 1957   4 Sheets-Sheet 2
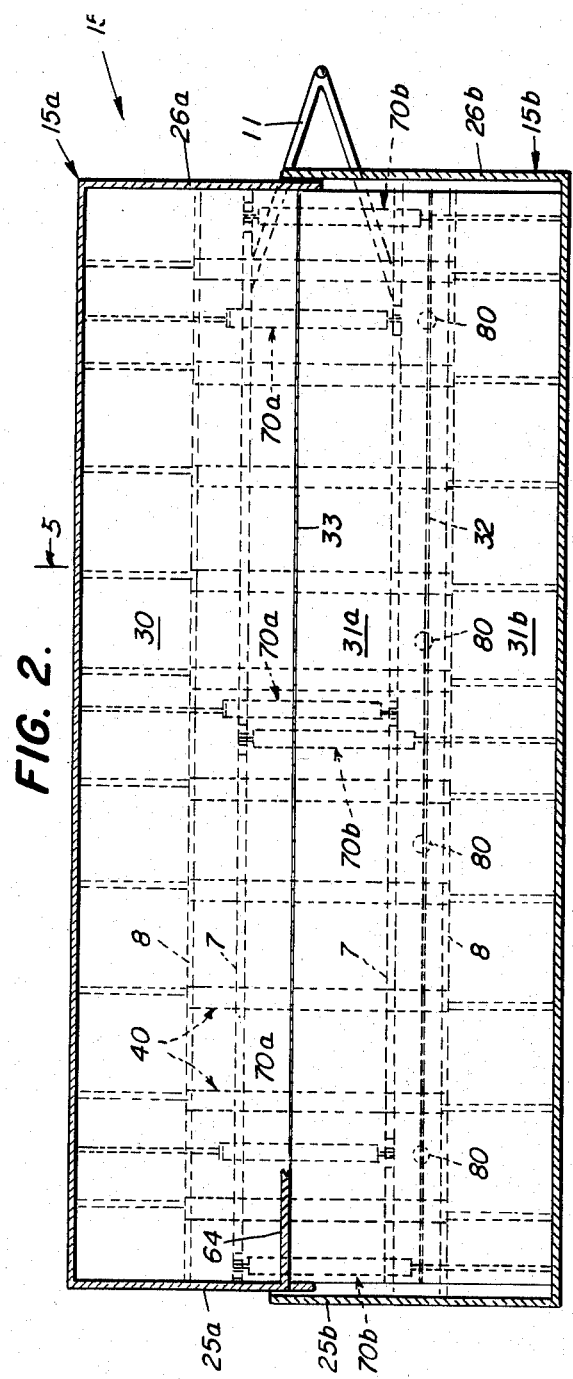
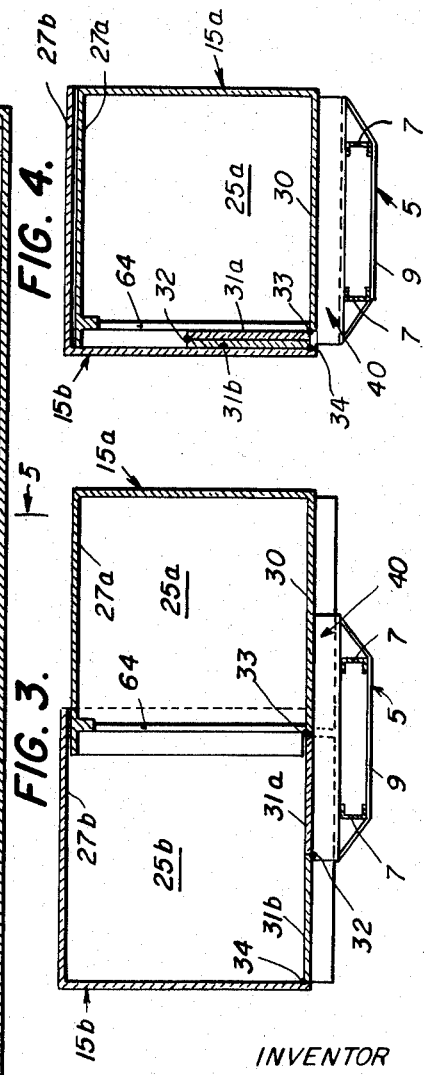
INVENTOR
ARCHIBALD G. MEAKER
BY
ATTORNEYS

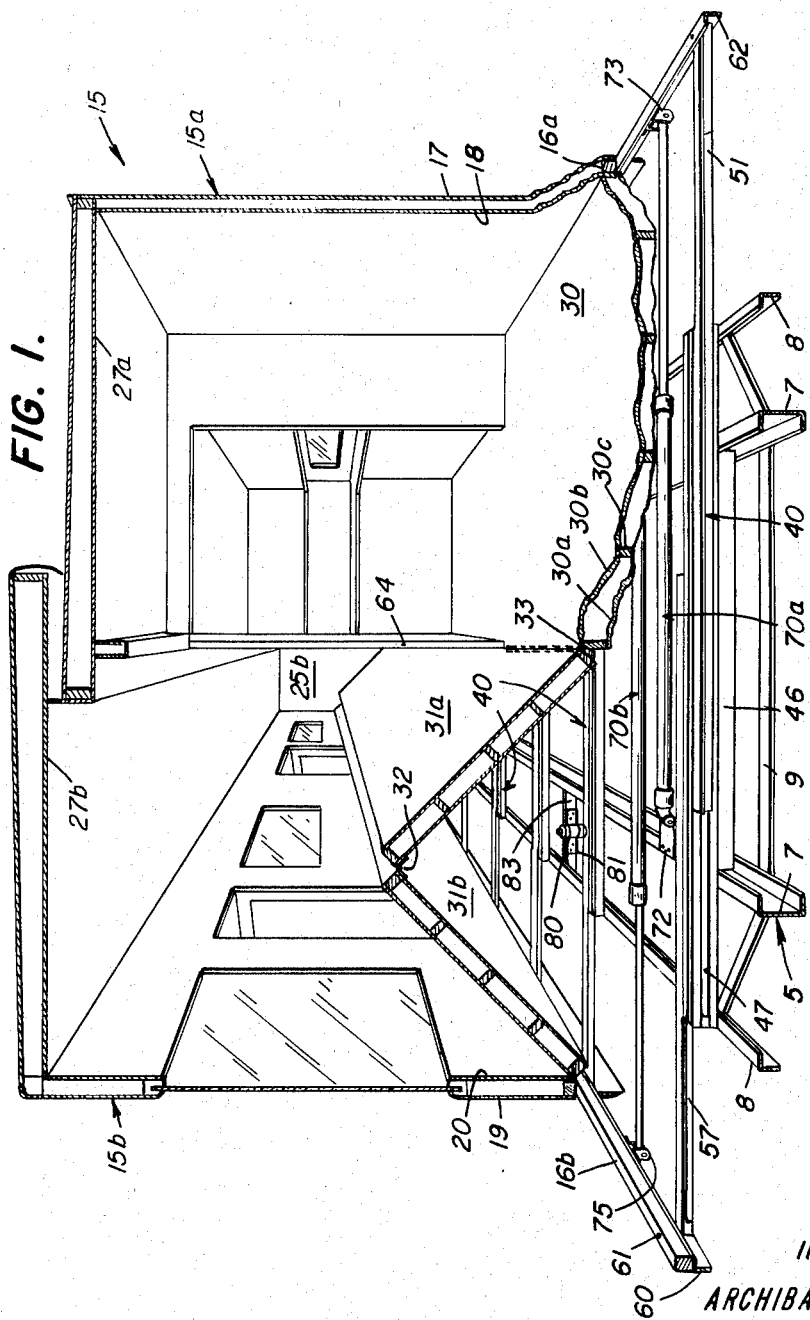

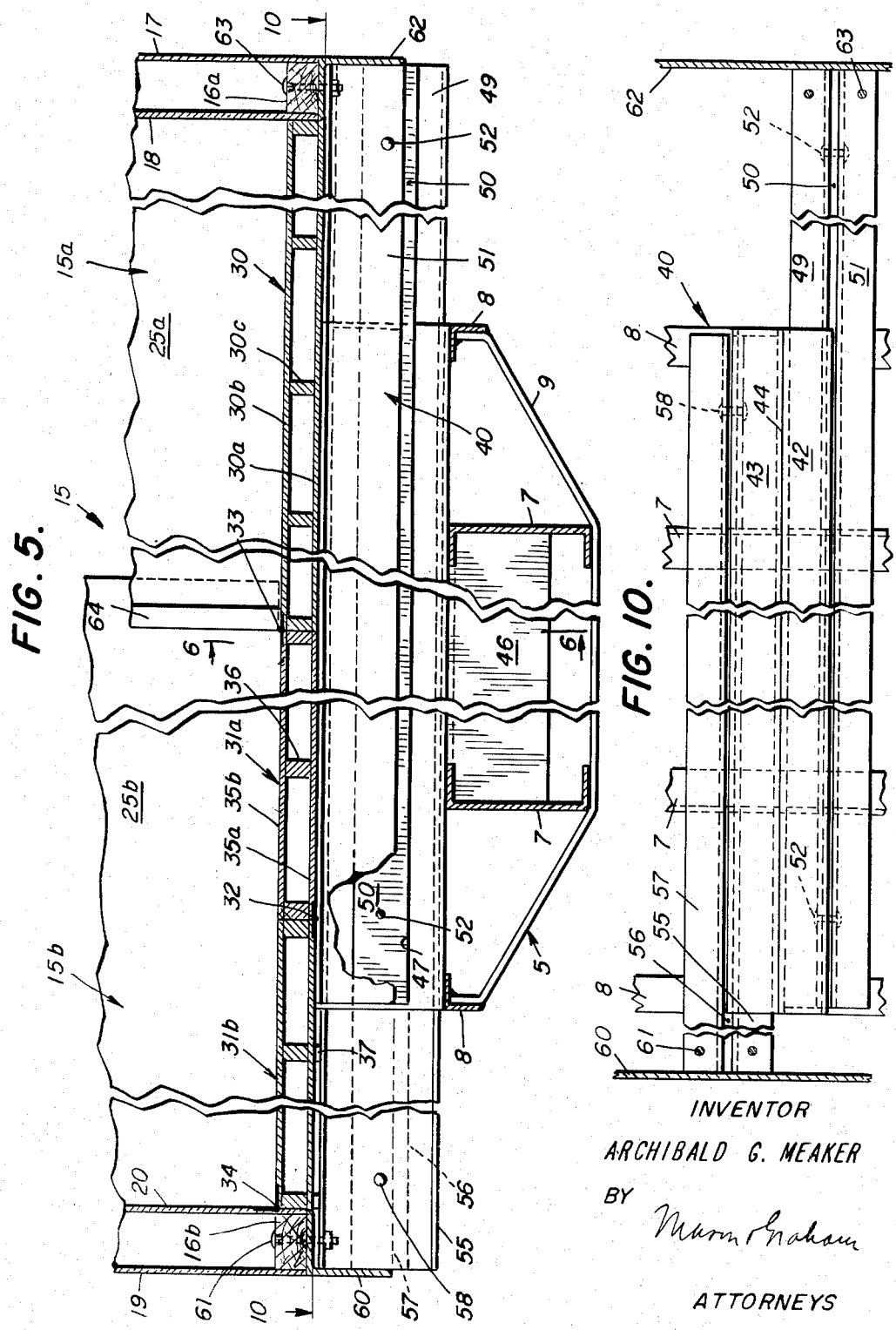
INVENTOR
ARCHIBALD G. MEAKER
BY
ATTORNEYS

Aug. 25, 1959 A. G. MEAKER 2,901,282
TRAILER CONSTRUCTION
Filed Jan. 15, 1957 4 Sheets-Sheet 4
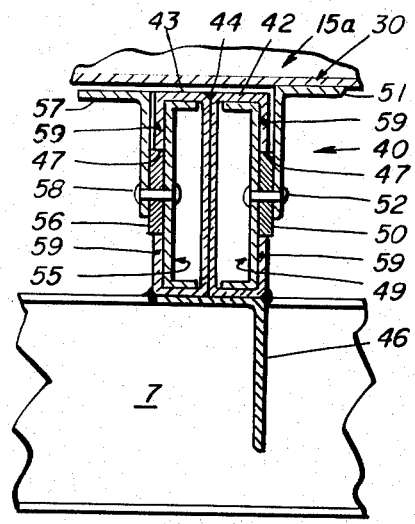
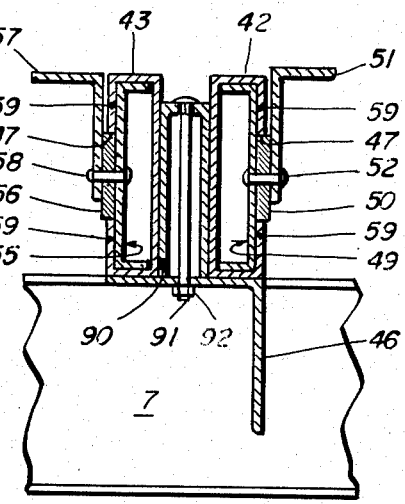
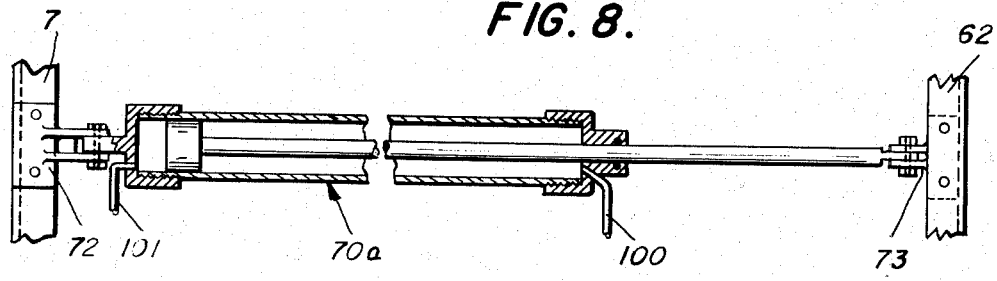
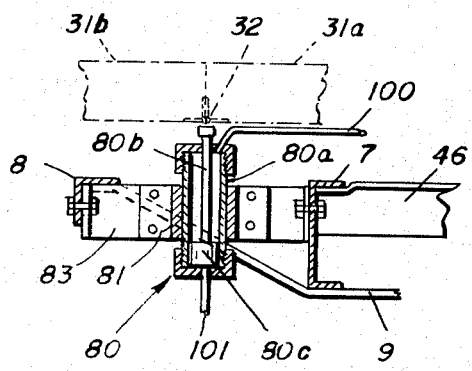
INVENTOR
ARCHIBALD G. MEAKER
BY Mason & Graham
ATTORNEYS

United States Patent Office 2,901,282
Patented Aug. 25, 1959

2,901,282

TRAILER CONSTRUCTION

Archibald G. Meaker, Corona, Calif., assignor of forty percent to Stanley B. Meaker, Arlington, Calif.

Application January 15, 1957, Serial No. 634,305

3 Claims. (Cl. 296—23)

This invention has to do with improvements in trailers and, more particularly, relates to improvements in laterally expansible and contractible house trailers.

It is an object of my present invention to provide a telescopically collapsible house trailer embodying an improved construction which enables the parts, or body sections, when expanded, to be supported solely by cantilever means without the necessity of props or additional supports. More specifically, it is an object to provide improved novel track and guide units which enable expansion and contraction with maximum ease and which fully support the expanded structure by cantilever action from a centrally located chassis frame.

It is a further object to provide a house trailer in which the complete floor for one side of the body is composed of floor elements arranged to be jackknifed into parallel contracted position, leaving the remainder of the body unobstructed.

A still further object of my invention is to provide a house trailer construction which utilizes for part of the body a permanently horizontal floor section which moves horizontally relative to the chassis during contraction and expansion and utilizes for the remainder of the body a pair of floor sections mounted for jackknifing movement at one side of the horizontal floor section and supported by cantilever means, when expanded, which construction provides a house trailer which, when expanded, is substantially twice its contracted width.

While I shall point out in the appended claims the features which I believe to be new, I shall now, for the purpose of explaining my invention, describe in detail a presently preferred embodiment thereof for which purpose I shall refer to the accompanying drawings wherein, Fig. 1 is a perspective view with the front end portion of the body being broken away for illustrative purposes;

Fig. 2 is a plan section taken immediately above the floor;

Fig. 3 is a schematic cross-section of the body in expanded position;

Fig. 4 is a schematic cross-section of the body in contracted position;

Fig. 5 is a section taken on line 5—5 of Fig. 2;

Fig. 6 is a section taken on line 6—6 of Fig. 5;

Fig. 7 is a sectional view showing a modified form of track and guide elements;

Fig. 8 is a longitudinal section of one of the body moving hydraulic elements;

Fig. 9 is a longitudinal section of one of the hydraulic jacks employed for breaking the dead center position of the jackknifing floor elements; and Fig. 10 is a view taken on line 10—10 of Fig. 5.

Referring now to the drawings, the numeral 5 generally denotes the chassis which, in use, is supported in a conventional manner by road wheels, not shown. The chassis comprises longitudinal channel beams 7, angles 8 and cross-members 9. A front towing member 11 is secured to the chassis.

The expansible and contractible body, generally denoted 15, comprises side wall plates 16a, 16b, spaced side wall members 17, 18 and 19, 20, telescopic rear end wall elements 25a, 25b, telescopic front end wall elements 26a, 26b; telescopic top wall elements 27a, 27b; a permanently horizontal floor section 30 comprised of spaced floor elements 30a, 30b having spacers 30c therebetween; and a pair of juxtaposed floor sections 31a, 31b hinged together at their contiguous side edges by a hinge 32, and preferably hinged at their outer side edges to the edge of floor section 30 and side wall plate 16b by hinges 33, 34, respectively. Each of sections 31a, 31b is composed of floor elements 35a, 35b having spacers 36 therebetween, the elements 35a having longitudinal ribs 37.

The body 15 is supported from the chassis by means of a plurality of longitudinally spaced telescopic cantilever units 40 of like construction and only one of which will now be described in detail (Figs. 5 and 6).

Each unit 40 comprises a pair of opposed tracks 42, 43 of C-shaped cross-section disposed in back-to-back contact and welded together at 44 as well as welded to an angle iron cross member 46, the latter member being welded at its ends to the chassis members 7.

In track 42 a reversely channeled slide 49 is mounted to slide longitudinally of the track, a slide block 50 being secured to the slide 49 and to an angle iron floor joist 51 by bolts or rivets 52. In track 43 a reversely channeled slide 55 is mounted to slide longitudinally thereof, a slide block 56 being secured to the slide 55 and to an angle iron floor joist 57 by rivets or bolts 58. The slides are retained against lateral movement in the tracks by the flanged portions 59 of the tracks, which flanges define a slot 47 to slidably receive the blocks 50, 56.

The slide 55 of each of the elements 40 is secured as by welding to an angle iron 60 secured to the bottom of wall plate 16b by bolts 61. The slide 49 of each element 40 is secured at its outer end, as by welding, to an angle iron member 62 secured to the bottom of side wall plate 16a by bolts 63. Also the outer end of each of the joists 51 is likewise secured to angle iron 62 while the outer end of each joist 57 is likewise secured to angle iron 60.

Thus, as the sides of the body are contracted, or moved toward each other, to telescope the end and top walls, the horizontal floor section 30 moves horizontally relative to the chassis from the position of Fig. 3 to the position of Fig. 4, while the floor sections 31a, 31b jackknife into upright parallel position as shown in Fig. 4.

So that, when expanded, the body is substantially twice the contracted width, I make the permanently horizontal floor section 30 slightly narrower than the combined width of the floor sections 31a, 31b (to the extent of the combined thickness of floor sections 31a, 31b) so that the latter, when jackknifed, will be positioned within the right hand portion of the body and flush with the longitudinal partition wall 64, as best shown in Fig. 4.

In order to prevent any rubbing contact between the joists 57 and the undersurface of floor section 30 during expansive and contractive movement, I slightly elevate the bottom of floor section 30 by having the top surface of the top arms of joists 51 slightly above the plane of the top surface of the top arm of joists 57.

For the purpose of moving the body sections between contracted and expanded positions, I provide a plurality of conventional hydraulic cylinder-piston units 70a, 70b, preferably there being three of the units 70a and the like number of the units 70b; the units 70a being disposed oppositely to the units 70b. Each of the said units is preferably of the same capacity.

As best shown in Figs. 1 and 8 the cylinder of each of the units 70a is pivotally secured at its closed end to one of the chassis members 7 by a bracket 72 and the outer end of its piston rod is pivotally secured to the angle or plate 62 by a bracket 73. The cylinder of each of the units 70b is pivotally secured at its closed end to the opposite chassis channel 7 by a like bracket 72 while the outer end of its piston rod is pivotally secured to angle 60 by bracket 75.

As will be apparent, when the floor sections 31a, 31b are in the horizontal or expanded position of Fig. 5, the hinge 32 will be on dead center, so that inward movement of the sides of the body would be thereby prevented. In order automatically to break this dead center position of the hinge when the fluid pressure is applied to the units 70a, 70b to move the sides together, I provide a plurality of vertically disposed conventional hydraulic jack units 80, each having a cylinder 80a, a piston rod 80b and a piston 80c. Each of the cylinders 80a is fixed by a suitable bracket 81 to a cross-member 83 carried by the chassis. Since the capacity of each of the jacks is smaller than that of each of the cylinders of the units 70a, 70b, the fluid pressure, when opened to the inner ends of the cylinders 80a, will first act on the pistons 80c to break the dead center position of hinge 32 to allow the sides of the body to be drawn toward each other by the units 70a, 70b.

From the foregoing description it will be observed that the body is centered on the chassis at all times when it is in either expanded or contracted position. The telescopic cantilever units are so designed and constructed that, when expanded, those portions of the body outwardly from the ends of the track members are adequately supported by the channeled slides which in turn are adequately supported by the channeled tracks. Also the described construction of the cantilever units facilitates their mounting on the chassis, facilitates ease of movement of the slides, effectively resists distortion of the tracks and guides and facilitates slightly elevating the bottom of floor section 30 to prevent rubbing contact between the joists 57 and said floor when the latter joists move under the floor section 30 during contraction and expansion.

In Fig. 7 I show a modified form of track and guide unit in which the parts are as before described and are given like reference numerals except that, instead of having the tracks 42, 43 in back-to-back contact and welding them together, I horizontally space them apart and weld to their backs an inverted U-shaped member 90 through which I dispose a bolt 91 which extends through the angle 46 and threadedly carries a nut 92 which bears against the bottom surface of the top arm of angle 46.

Each of the hydraulic elements 70a, 70b, 80 is connected into a conventional hydraulic fluid pressure system, not shown, by conduits 100, 101.

The right hand side 15a of the body has a longitudinal partition wall 64 spaced inwardly from the left hand edge of said side a distance equal to the combined thickness of floor sections 31a, 31b, so that when the body is in contracted position those floor sections will jackknife into upright position against said partition wall. This is so that when the body is contracted, which is its towing position, the over all width of the contracted body may be within the legal limits of eight feet, although when expanded the body has an over all width of approximately sixteen feet.

Preferably such items of furniture as may be used in the left hand side 15b of the body when it is expanded, are mounted upon rollers or casters so that, when the body is contracted, they may be rolled in the right hand side 15a.

I claim:
1. In a laterally expansible and contractable house trailer, a road-wheel supported chassis, parallel, juxtaposed track members secured in back-to-back relationship to and disposed transversely of said chassis, each of said track members being of C-shaped cross section, a channelled slide member longitudinally slideably engaging opposite portions of each of said track members with its channel opening towards the back of its carrying track member, a floor joist disposed along and secured to each of said slide members whereby to move therewith, a body having relatively laterally movable side portions secured to said slide members, a permanently horizontal floor carried by some of said joists, said floor being movable with said joist upon which it is carried between a position substantially centered on said chassis and a position laterally offset relative to the center of said chassis, a collapsible floor comprising two juxtaposed floor elements having their contiguous edge portions hinged together for jack-knifing swinging movement between horizontal expanded position and upright collapsed position, others of said floor joists being disposed to support said floor elements when the latter are in horizontal expanded position, said floor elements being interposed between the inner edge of said permanently horizontal floor and the contiguous side portion of said body, whereby to be moved between collapsed and expanded positions in response to relative lateral movement of said side portions, and means for so moving said side portions.

2. The trailer of claim 1 wherein the combined width of said collapsible floor elements is greater to the extent of their combined thickness than the width of said permanently horizontal floor, whereby when said body is in contracted position, said floor elements are jack-knifed into upright parallel relationship in a position overlying the contiguous end portions of said track members.

3. In a laterally expansible and contractible house trailer having a chassis and relatively laterally movable side portions and a laterally expansible and contractible floor, cantilever units carried by said chassis, each of said cantilever units comprising a pair of oppositely disposed, back-to-back positioned, parallel track members each of C-shaped cross section, the free edges of each of which define a longitudinal slot, a slide member of channelled cross section disposed in each of said track members and having its channel opening towards the back portion of its carrying track member, a pair of slide blocks disposed in and slideable along said respective slots, means securing said respective slide blocks to said respective slide members, and floor joist means secured to said respective slide blocks for supporting said floor.

References Cited in the file of this patent

UNITED STATES PATENTS

| | | |
|---|---|---|
| 2,147,892 | Gray | Feb. 21, 1939 |
| 2,675,277 | McClellan | Apr. 13, 1954 |
| 2,732,251 | Meaker | Jan. 24, 1956 |

FOREIGN PATENTS

| | | |
|---|---|---|
| 1,015,333 | France | July 9, 1952 |
| 1,068,990 | France | Feb. 10, 1954 |
| 679,285 | Great Britain | Sept. 17, 1952 |
| 725,918 | Great Britain | Mar. 9, 1955 |